United States Patent [19]

Lührsen et al.

[11] Patent Number: 5,072,864
[45] Date of Patent: Dec. 17, 1991

[54] CARBON-CONTAINING WEARABLE REFRACTORY PARTS

[75] Inventors: Ernst Lührsen, Bad Schwalbach; Andreas Schuler, Taunusstein-Wehen; Ullrich Hintzen, Taunusstein-Watzhahn, all of Fed. Rep. of Germany

[73] Assignee: Didier-Werke AG, Wiesbaden, Fed. Rep. of Germany

[21] Appl. No.: 582,612

[22] Filed: Sep. 14, 1990

[30] Foreign Application Priority Data

Sep. 15, 1989 [DE] Fed. Rep. of Germany ....... 3930866

[51] Int. Cl.$^5$ .............................................. B22D 41/32
[52] U.S. Cl. .................................... 222/600; 222/597
[58] Field of Search ............... 222/590, 600, 591, 597; 501/96, 99; 266/236, 280, 286

[56] References Cited

U.S. PATENT DOCUMENTS 4,108,675 8/1978 Tomita et al. ..................... 222/600
4,617,232 10/1986 Chandler et al. ................... 222/590

FOREIGN PATENT DOCUMENTS 2177390 11/1973 France .
2451694 10/1980 France .
0046987 3/1985 Japan ................................. 222/600

OTHER PUBLICATIONS

Page 288 of "6001 Chemical Abstracts" 104 (1986) May.
Page 348 of "6001 Chemical Abstracts" 122 (1990) Feb.

*Primary Examiner*—S. Kastler
*Attorney, Agent, or Firm*—Wenderoth, Lind & Ponack

[57] ABSTRACT

Disclosed are wearable carbon-containing refractory elements, such as wearable refractory parts of a slide valve for use in controlling flow of molten metal from a metallurgical vessel, which are impregnated with tar or other wear reducing agent. In order to prevent decarburization of the refractory elements, they are saturated in an aqueous borate solution and then dried, so that the borate will migrate outwardly toward the surfaces of the elements and form protective layers which will prevent infiltration of ambient air into the refractory material. Prior to saturation of the elements in the borate solution, the wearable surfaces of the elements, such as those surfaces which will be subject to contact with molten metal, are coated with film which will prevent saturation by the borate solution, such that no protective layer is formed at the wearable surfaces. This allows the tar or other wear reducing agent to migrate outwardly through the wearable surfaces so as to reduce wear caused by the molten metal.

21 Claims, 1 Drawing Sheet

CARBON-CONTAINING WEARABLE REFRACTORY PARTS

BACKGROUND OF THE INVENTION

The present invention relates generally to carbon-containing refractory elements which are subject to thermo-chemical attacks in atmospheric air, and more specifically to wearable carbon-containing parts of a slide valve for use in controlling flow of molten metal from a metallurgical vessel.

Various refractory elements, such as molded bodies and wearable slide valve parts, include carbon in the refractory material. These refractory elements can be formed by various methods including molding and compression techniques. The carbon contained in such refractory elements may be included with the refractory material as, for example, a material fraction, a component of a binder, or an impregnating agent. When such elements are used at elevated temperatures, some degree of decarburization will invariably take place whenever the element is exposed to oxygen. Such decarburization generally begins at about 400° C. and becomes quite pronounced at about 600° C. The decarburization begins at the outer surfaces of the element which are exposed to the ambient air (or other oxidizing medium) and, as the air penetrates into the pores vacated by the carbon, takes place increasingly deeper within the refractory element. As the decarburization moves inwardly from the outer exposed surfaces, it increases the porosity of the refractory element, thereby decreasing the strength and stability thereof. This leads to premature wear of the refractory element, and will eventually destroy the element for its intended purpose.

When the carbon-containing refractory elements are wearable parts of a slide valve for use with a metallurgical vessel, they are, in addition to being subjected to decarburization, subjected to the normal chemical erosion and thermal shock and/or abrasive wear caused by contact with molten metal at high operating temperatures of the slide valve. This contributes to the wear of the refractory elements and results in an even quicker destruction of the elements for their intended purpose. The wearable refractory parts which are utilized in the slide valve can be, for example, inlet sleeves, bottom plates, slide plates, and/or outlet sleeves. Due to the conditions in which these parts are used, including the chemical and abrasive wear caused by contact with molten metal at high operating temperatures and the decarburization discussed above, these parts must be replaced frequently.

In order to inhibit the chemical and abrasive wear of the wearable slide valve parts due to contact with the molten metal, it is known to impregnate the refractory parts with an impregnating agent such as tar or the like. During operation of the slide valve, the tar impregnated in the refractory parts migrates toward wearable surfaces (i.e. surfaces subjected to wear due to contact with the molten metal) of the parts and acts as a lubricating agent and to otherwise protect the wearable surfaces. However, the tar migrates toward not only the wearable surfaces, but also toward the surfaces which are exposed to the ambient air. From these exposed surfaces, the tar evaporates and otherwise escapes. The escaped tar creates environmental pollution and also contaminates the slide valve and its operating equipment.

It has been proposed in DE 3921 794.9 and corresponding U.S. application Ser. No. 07/547,149, filed July 3, 1990, to provide refractory elements of a slide valve with a gas impermeable thermally stable sealing layer over the surfaces thereof which are exposed to the ambient air.

It has also been proposed in DE 33 13 015 A1, which corresponds to U.S. Pat. Nos. 4,617,232 and 4,621,017, to provide an article formed of graphite or other carbon material with a protective layer of silicon carbide (SiC) so as to protect against corrosion and oxidation at high temperatures. It is also disclosed in these documents that it has been suggested to first coat the graphite article with silicon carbide or silicon oxicarbide and then additionally coat it with a glaze chosen from among oxides of boron, silicon, aluminum, phosphorus, magnesium, calcium and zirconium, so as to avoid cracking of the SiC coating when subject to thermal shock. However, these documents do not suggest the use of a boron-based impregnating agent alone to protect against corrosion and oxidation. Additionally, these documents do not suggest use of those coatings on tar-containing or tar-saturated refractory elements. Also, the process of coating the graphite article is an expensive multiple step process.

SUMMARY OF THE INVENTION

An object of the present invention is to prevent, or at least inhibit decarburization of carbon-containing elements, and in particular of wearable carbon-containing refractory parts of a slide valve, so as to thereby increase their useful life and decrease the frequency with which they must be replaced.

A further object of the present invention is to prevent decarburization while simultaneously preventing the evaporation and escape of tar or the like from the surfaces of the refractory parts exposed to ambient air.

An additional object of the present invention is to prevent such decarburization and such emission of tar by way of a relatively inexpensive and simple process.

These objects are achieved according to the invention by providing a wearable carbon-containing refractory element, having an exposed surface which is subject to thermo-chemical attack in ambient air, with a protective layer on the exposed surface formed of a boron-based impregnating agent impregnated in the refractory material. The boron-based impregnating agent utilized is preferably an aqueous borate solution.

The present invention can be carried out with refractory elements formed by any of various known production methods, such as molding and compression production methods, but is contemplated specifically for use with molded refractory elements.

To provide this protective layer, the refractory element is saturated in the aqueous borate solution. The refractory element is then dried at about 100° C., thereby causing the borate to migrate outwardly with the water of crystallization toward the surfaces of the refractory element. This causes a gas-impermeable layer to be formed at the surface of the refractory element. The protective effect of the gas-impermeable layer is improved when the refractory element is exposed to high operating temperatures, including temperatures as low as 400° C., the temperature at about which decarburization normally begins. Therefore, when the refractory elements are exposed to operating temperatures which would normally cause decarburization, the protective layer formed by the borate solution prevents ambient air (or other oxidizing agent) from infiltrating the refractory element and reacting with the carbon-contained in the refractory material.

The provision of the protective layer formed by the borate solution is especially important when the refractory element is a wearable refractory part of a slide valve, such as an inlet sleeve, a bottom plate, a slide plate and/or an outlet sleeve, because such parts are subject to temperatures of at least 400° C. during operation. The protective layer increases the life span of the parts, as well as inhibits the harmful emission of tar vapors from such parts when they are impregnated with tar so as to prevent wear of the wearable surfaces. Although impregnation of the carbon-containing wearable refractory parts with tar or the like may slow the decarburization process, without formation of the protective layer, the tar cannot significantly prevent the decarburization even when the parts are repeatedly impregnated with additional tar, and even if the impregnation is carried out in a vacuum condition and the parts are subsequently annealed. The reason that impregnation with tar cannot prevent the decarburization of the refractory parts is that because of the viscosity of tar, the tar does not permeate into many of the smaller pores of the porous refractory material, but ambient air can permeate into such smaller pores. The borate solution is much less viscous than the tar and will thus permeate into much smaller pores of the refractory material, and thereby prevent permeation by the ambient air (or other oxidizing agent) into even extremely small pores. In this manner, decarburization of the carbon-containing refractory parts is prevented or at least significantly reduced.

Even with the provision of the protective layer formed with the borate solution, the wearable surfaces of the refractory parts are subject to chemical and abrasive wear caused by contact with molten metal (or other wear inducing substance in the case of refractory elements not utilized in a slide valve). Therefore, it remains desirable to impregnate the refractory parts with tar (or other wear reducing agent) and to provide for the tar to escape through the wearable surfaces of the refractory elements so as to reduce wear caused by contact with the molten metal. Accordingly, it is desirable to prevent the borate solution from forming a protective layer at the wearable surfaces, so that tar can be impregnated into the portions of the refractory parts which are not impregnated with the borate solution, and allow the tar to escape through the wearable surfaces. The provision of the protective layer formed by the borate solution at surfaces other than the wearable surfaces prevents tar impregnated in the refractory material from migrating toward other than the wearable surfaces. Therefore, according to the present invention, prior to the saturation of the refractory parts with the borate solution, the wearable surfaces are to be coated with a film which will prevent impregnation by the borate solution. This film can be paint or any other substance which will prevent impregnation by the borate solution, but which will dissolve at operating temperatures of the slide valve so as to allow tar to escape from the wearable surfaces.

When the wearable surfaces are so coated, and the refractory parts are then saturated with the borate solution, a protective layer will be formed by the borate solution at all the surfaces except the wearable surfaces. When the remaining portions of the refractory parts have been impregnated with tar, decarburization of the refractory parts is effectively prevented during operation at the high operating temperatures of the slide valve and the tar is allowed to escape through only the wearable surfaces so as to reduce wear thereof caused by contact with the molten metal. Because the tar is allowed only to escape through the wearable surfaces, it is forced to migrate toward the wearable surfaces and is thus utilized in a much more efficient manner.

BRIEF DESCRIPTION OF THE DRAWING FIGURES

The present invention will now be described more fully below with reference to the drawing figures, in which:

FIG. 1 is a cross-sectional elevation view of a bottom plate of a slide valve, according to the present invention, usable for controlling flow of molten metal from a metallurgical vessel; and FIG. 2 is a cross-sectional elevation view of a slide plate of the slide valve according to the present invention.

DETAILED DESCRIPTION OF THE INVENTION

Figure 1:
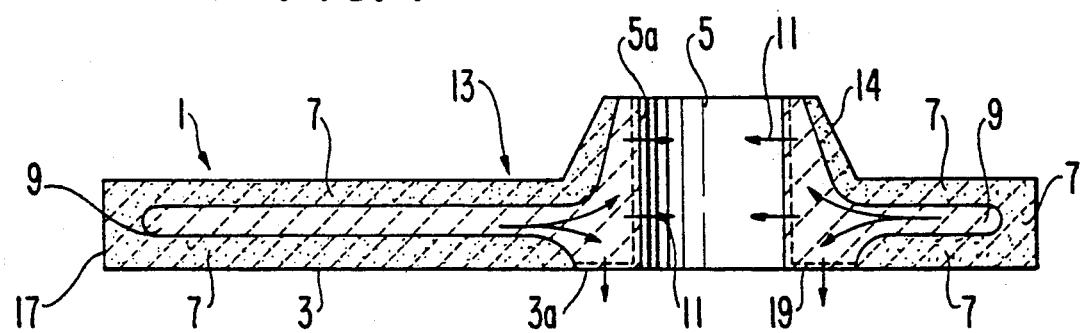
Figure 2:
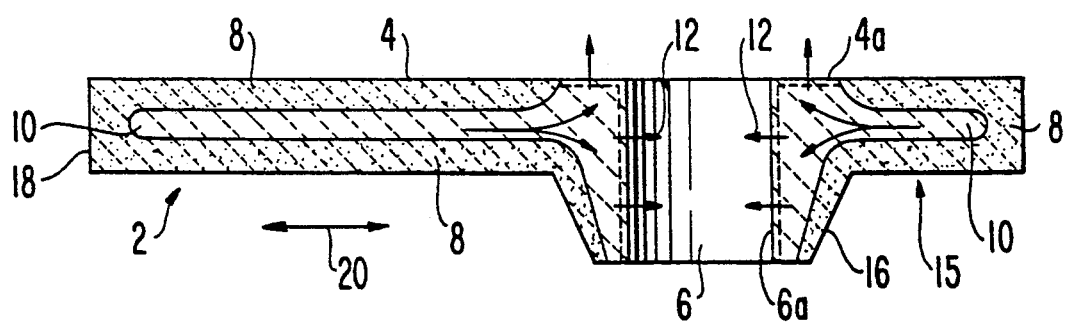

FIGS. 1 and 2 show two different wearable refractory parts of a slide valve for use in controlling flow of molten metal from a metallurgical vessel. Such a slide valve normally includes a plurality of wearable refractory parts including an inlet sleeve (not shown) which is adapted to be connected to a metallurgical vessel (not shown), a bottom plate 1 (see FIG. 1) adapted for engagement with the inlet sleeve, a slide plate 2 (see FIG. 2) adapted for sliding contact with the bottom plate 1, and an outlet sleeve (not shown) adapted for engagement with the slide plate 2. These wearable parts are formed of a refractory material, such as ceramic or the like, which may contain carbon. The carbon contained in the refractory material may be as a material fraction, as a component of a binder, or as an impregnating agent such as tar. Although the present invention is adaptable to any of the refractory parts of a slide valve, as well as to other refractory elements, only the bottom plate 1 and the slide plate 2 will be described in detail.

As shown in FIG. 1, the bottom plate 1 includes a flow channel 5 formed therethrough to allow for flow of molten metal from the metallurgical vessel. The flow channel 5 includes a flow channel surface 5a which is subject to thermo-chemical attack and shock and to wear due to contact with the molten metal. The bottom plate also includes an upper surface 13 which is, in general, an exposed surface which is exposed to the ambient air. The upper surface 13 includes an upwardly extending protrusion 14 which is adapted for engagement in a complementary recess formed in the inlet sleeve (not shown). The bottom plate 1 further includes sidewalls 17 which define exposed surfaces exposed to the ambient air, and a lower surface 3 which is a precision planar surface, which may be formed by precision grinding, a large portion of which defines an exposed surface which can be exposed to the ambient air depending on the position of the bottom plate 1 relative to the slide plate 2. A portion of the lower surface 3 which surrounds the flow channel opening defines a wearable surface 3a which is subject to contact with the molten metal.

The slide plate 2 has a flow channel 6 formed therethrough to provide for flow of molten metal. The flow channel 6 includes a flow channel surface 6a which is subject to thermo-chemical attack and shock and to wear caused by contact with the molten metal. As shown in FIG. 2, the slide plate 2 includes an upper surface 4 which is a precision planar surface and is adapted for sliding contact with the lower surface 3 of the bottom plate 1. As previously stated, the slide plate 2 is slidable in the directions indicated by arrow 20 relative to the bottom plate 1 so as to selectively align and misalign the flow channel 6 relative to the flow channel 5 to thereby provide for control of the flow of molten metal from the metallurgical vessel. Due to this relative sliding between the slide plate 2 and the bottom plate 1, a major portion of the upper surface 4 of the slide plate 2 may be exposed to the ambient air depending on its position relative to the lower surface 3 of the bottom plate 1. The portion of the upper surface 4 which directly surrounds the flow channel 6 is also subject to contact with the molten metal and thus defines a wearable surface 4a. The slide plate 2 also includes sidewalls 18 which define exposed surfaces exposed to the ambient air, and a lower surface 15 which, in general, defines an exposed surface which is exposed to the ambient air. The lower surface 15 includes a downwardly extending protrusion 16 which is adapted for engagement with a complementary recess of the outlet sleeve (not shown).

The refractory parts are impregnated with a wear reducing agent such as tar or the like and are then subject to an annealing process. The wearable surfaces 3a, 4a, 5a and 6a are then coated or sprayed with a film 19 of a wear reducing agent such as paint or the like which will dissolve at operating temperatures of the slide valve. After the film 19 is provided on the wearable surfaces 3a, 4a, 5a and 6a, the refractory parts are thoroughly saturated in an aqueous borate solution.

Although various borate solutions can be utilized, a preferred borate solution comprises borax dissolved in warm water. More specifically, a preferred solution comprises approximately 60 percent borax and 40 percent boric acid and water.

After saturation in the borate solution, the refractory parts are then dried at a temperature of about 100° C., such that the borate migrates outwardly toward the surfaces of the refractory parts and forms case-hardened protective layers 7 and 8. Because of the outward migration of the borate toward the surfaces of the refractory parts, inner cores 9 and 10 remain void of the borate such that they can be impregnated by tar. Furthermore, because the wearable surfaces 3a, 4a, 5a and 6a were previously coated with the film 19, the wearable surfaces are also void of the protective layer formed by the borate solution.

In this manner, when the refractory parts are utilized in the slide valve at operating temperatures, the film 19 is dissolved such that the tar impregnated in cores 9 and 10 will migrate toward the surfaces which are not blocked by way of the protective layers 7 and 8. That is, the tar will migrate toward the wearable surfaces 3a, 4a, 5a and 6a through which the tar will escape and thus act as a wear reducing agent to reduce wear caused by contact of the wearable surfaces with the molten metal. The migration of the tar is shown by arrows 11 and 12. Use of the borate solution, the film 19, and the tar or other wear reducing agent with carbon-containing wearable refractory parts in the manner heretofore described will result in an increase in the useful life of the wearable refractory parts, and a corresponding decrease in the frequency with which the parts must be replaced. It is also noted that the tar or other wear reducing agent which escapes through the wearable surfaces 3a and 4a will provide lubrication for the precision planar surfaces 3 and 4 as they slide relative to one another, and thereby further decrease the wear of the bottom plate 1 and the slide plate 2 of the slide valve.

Although the present invention has been described most fully in connection with the illustrated bottom plate 1 and slide plate 2, it is also adaptable to the inlet and outlet sleeves of the slide valve, as well as to other wearable carbon-containing refractory elements. Such refractory elements can be molded refractory elements or compressed refractory elements. With respect to the inlet and outlet sleeves, at least the flow channel surfaces of the flow channels which are defined therethrough will be coated with the film 19 such that no protective layer is formed at these surfaces upon saturation of the sleeves in the borate solution.

Although the protective layers 7 and 8 have been described as being formed by a borate solution, other solutions which have similar properties may be used. Additionally, although the film 19 has been described as being a paint or the like, which can be a marine paint, any substance which has the same or similar properties and which will function in the intended manner can be used. It is also preferable that the borate solution be a holohedral borate solution when the refractory element is to be used in connection with aggressive molten steel.

Although the present invention has been fully described with reference to the accompanying drawings, it is contemplated that many changes can be made that remain within the scope of the appended claims.

We claim:

1. An element formed of a carbon-containing refractory material, having an exposed surface which is subject to thermo-chemical attack in ambient air, said exposed surface having a protective layer formed of a boron-based impregnating agent impregnated in said refractory material, said element further including at least one wearable surface subject to wear due to contact with a wear inducing substance, said at least one wearable surface having thereon a film means for preventing impregnation by said boron-based impregnating agent, and wherein portions of said refractory material other than said protective layer are impregnated with a wear reducing substance comprising tar.

2. An element as recited in claim 1, wherein
said boron-based impregnating agent comprises an aqueous borate solution.

3. An element as recited in claim 1, wherein
said film means comprises paint.

4. An element as recited in claim 1, wherein
said film means comprises a substance which dissolves at a predetermined temperature.

5. An element as recited in claim 1, wherein
said film means comprises means for sealing said at least one wearable surface prior to exposure to temperatures above a predetermined temperature and for allowing said wear reducing substance to escape through said at least one wearable surface subsequent to exposure to said temperatures above said predetermined temperature.

6. An element as recited in claim 1, wherein
said element comprises a wearable part of a slide valve usable for controlling molten metal flow from a metallurgical vessel; and
said wearable part has a flow channel formed therethrough, said flow channel has a flow channel surface, and said flow channel surface defines one of said at least one wearable surface.

7. An element as recited in claim 6, wherein said wearable part comprises a slide plate.

8. An element as recited in claim 7, wherein said at least one wearable surface comprises plural wearable surfaces, said slide plate includes an upper surface adapted for sliding contact with a bottom plate, said flow channel opens through said upper surface, and a portion of said upper surface surrounding said flow channel opening defines one of said wearable surfaces.

9. An element as recited in claim 6, wherein said wearable part comprises a bottom plate.

10. An element as recited in claim 9, wherein said at least one wearable surface comprises plural wearable surfaces, said bottom plate includes a lower surface adapted for sliding contact with a slide plate, and a portion of said lower surface surrounding said flow channel opening defines one of said wearable surfaces.

11. A slide valve for use in controlling flow of molten metal from a metallurgical vessel and including at least one wearable part, said at least one wearable part being formed of a carbon-containing refractory metal and having an exposed surface which is subject to thermochemical attack in ambient air, said exposed surface having a protective layer formed of a boron-based impregnating agent impregnated in said refractory material, said at least one wearable part further including at least one wearable surface subject to wear due to contact with the molten metal, said at least one wearable surface having thereon a film means for preventing impregnation by said boron-based impregnating agent, wherein portions of said refractory material other than said protective layer are impregnated with a wear reducing substance comprising tar.

12. A side valve as recited in claim 11 wherein said born-based impregnating agent comprises as aqueous borate solution.

13. A slide valve as recited in claim 11, wherein said film means comprises paint.

14. A slide valve as recited in claim 11, wherein said film means comprises a substance which dissolves at a predetermined operating temperature of the slide valve.

15. An element as recited in claim 11, wherein said film means comprises means for sealing least one wearable surface prior to exposure to temperatures above a predetermined temperature and for allowing said wear reducing substance to escape through said at least one wearable surface subsequent to exposure to said temperatures above said predetermined temperature.

16. An element as recited in claim 11, wherein said at least one wearable part has a flow channel formed therethrough, said flow channel has a flow channel surface, and said flow channel surface defines one of said at least one wearable surface.

17. An element as recited in claim 16, wherein said at least one wearable part comprises a slide plate.

18. An element as recited in claim 17, wherein said at least one wearable surface comprises plural wearable surfaces, said slide plate includes an upper surface adapted for sliding contact with a bottom plate, said flow channel opens through said upper surface, and a portion of said upper surface surrounding said flow channel opening defines one of said wearable surfaces.

19. An element as recited in claim 16, wherein said at least one wearable part comprises a bottom plate.

20. An element as recited in claim 19, wherein said at least one wearable surface comprises plural wearable surfaces, said bottom plate includes a lower surface adapted for sliding contact with a slide plate, and a portion of said lower surface surrounding said flow channel opening defines one of said wearable surfaces.

21. An element as recited in claim 16, wherein said at least one wearable part comprises plural wearable parts and said plural wearable parts comprise a slide plate and a bottom plate.

* * * * *